(12) United States Patent
Nguyen et al.

(10) Patent No.: US 9,644,534 B2
(45) Date of Patent: May 9, 2017

(54) SYSTEMS AND METHODS FOR IMPLEMENTING ENGINE CYCLE COUNT

(71) Applicant: General Electric Company, Schenectady, NY (US)

(72) Inventors: John Thanh Nguyen, Houston, TX (US); Jesus Elios Almendarez, Queretaro (MX); Cesar Ortiz, Queretaro (MX)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 13/743,006

(22) Filed: Jan. 16, 2013

(65) Prior Publication Data

US 2014/0196462 A1 Jul. 17, 2014

(51) Int. Cl.
*F02C 7/00* (2006.01)
*G05B 23/02* (2006.01)
*G07C 3/00* (2006.01)

(52) U.S. Cl.
CPC ............ *F02C 7/00* (2013.01); *G05B 23/0272* (2013.01); *G05B 23/0283* (2013.01); *G07C 3/00* (2013.01)

(58) Field of Classification Search
CPC ... F02C 9/28; F02C 7/00; F02C 7/057; G05B 23/0283; G05B 23/0272; G07C 3/00
See application file for complete search history.

(56) References Cited

U.S. PATENT DOCUMENTS

| | | | |
|---|---|---|---|
| 4,112,747 A | 9/1978 | Aldridge et al. | |
| 5,447,059 A | * 9/1995 | Miller et al. | ............... 73/112.03 |
| 6,490,543 B1 | 12/2002 | Jaw | |
| 2007/0016818 A1 | 1/2007 | DellaVilla, Jr. et al. | |
| 2011/0296810 A1* | 12/2011 | Hardwicke | ........ G05B 23/0283 60/39.091 |

FOREIGN PATENT DOCUMENTS

WO 9518364 A1 7/1995

OTHER PUBLICATIONS

Reply to the Written Opinion of the International Searching Authority for International Application No. PCT/US2013/032343 filed Jun. 6, 2014.
Search Report for International Application No. PCT/US2013/032343 mailed Oct. 2, 2013.
PCT Written Opinion of the International Preliminary Examining Authority for International Application No. PCT/US2013/032343 mailed Jan. 7, 2015.
Reply to the Written Opinion of the International Searching Authority for International Application No. PCT/US2013/032343 filed Mar. 9, 2015.
International Preliminary Report on Patentability for International Application No. PCT/US2013/032343 dated Apr. 10, 2015.

* cited by examiner

*Primary Examiner* — Craig Kim
(74) *Attorney, Agent, or Firm* — Eversheds-Sutherland (US) LLP

(57) ABSTRACT

Systems and methods for implementing engine cycle counts are disclosed. One method may include determining, by at least one processor, a plurality of cycles associated with an engine; determining a category, by at least one processor, for each of the plurality of cycles based at least in part on an acceleration value associated with each of the plurality of cycles; and predicting, by at least one processor, a life cycle associated with the engine based at least in part on the determined category.

19 Claims, 2 Drawing Sheets

SYSTEMS AND METHODS FOR IMPLEMENTING ENGINE CYCLE COUNT

TECHNICAL FIELD

The present disclosure relates generally to gas turbine engines and more particularly to systems and methods for implementing engine cycle counts for turbine engines including gas turbine engine cycle counts.

BACKGROUND

Gas turbine engines may include a number of functional sections such as a compressor and an inlet. Other sections may include a fan section, a combustion section, and a turbine section. Air and fuel are combusted in the combustion section and move to the turbine rotors. These various parts are subject to varying levels of stress and degradation. Therefore, identifying a degradation level for replacement of the engine parts may include a complicated analysis.

SUMMARY

Some or all of the above needs and/or problems may be addressed by certain embodiments of the disclosure. Disclosed embodiments may include implementations of engine-part cycle count. According to certain embodiments, there is disclosed a method for determining a plurality of cycles associated with an engine; determining a category for each of the plurality of cycles based at least in part on an acceleration value associated with the plurality of cycles; and predicting a life cycle associated with the engine based at least in part on the determined category.

According to other embodiments, there is disclosed an apparatus including an engine; a counter configured to identify a plurality of cycle counts associated with the engine; and control logic, having at least one processor, configured to identify a category for each of the plurality of cycle counts to predict a life cycle based at least in part on the identified category.

Further embodiments may disclose one or more computer-readable media storing computer-executable instructions that, when executed by at least one processor, configure the at least one processor to perform operations including: determining, by at least one processor, a plurality of cycles associated with an engine; determining a category, by at least one processor, for each of the plurality of cycles based on an acceleration value associated with each of the plurality of cycles; and predicting, by at least one processor, a life cycle associated with the engine based at least in part on the determined category.

Other embodiments, aspects, and features of the disclosure will become apparent to those skilled in the art.

BRIEF DESCRIPTION OF THE DRAWINGS

Reference will now be made to the accompanying drawings, which are not necessarily drawn to scale, and wherein.

DETAILED DESCRIPTION OF THE DRAWINGS

Figure 1:
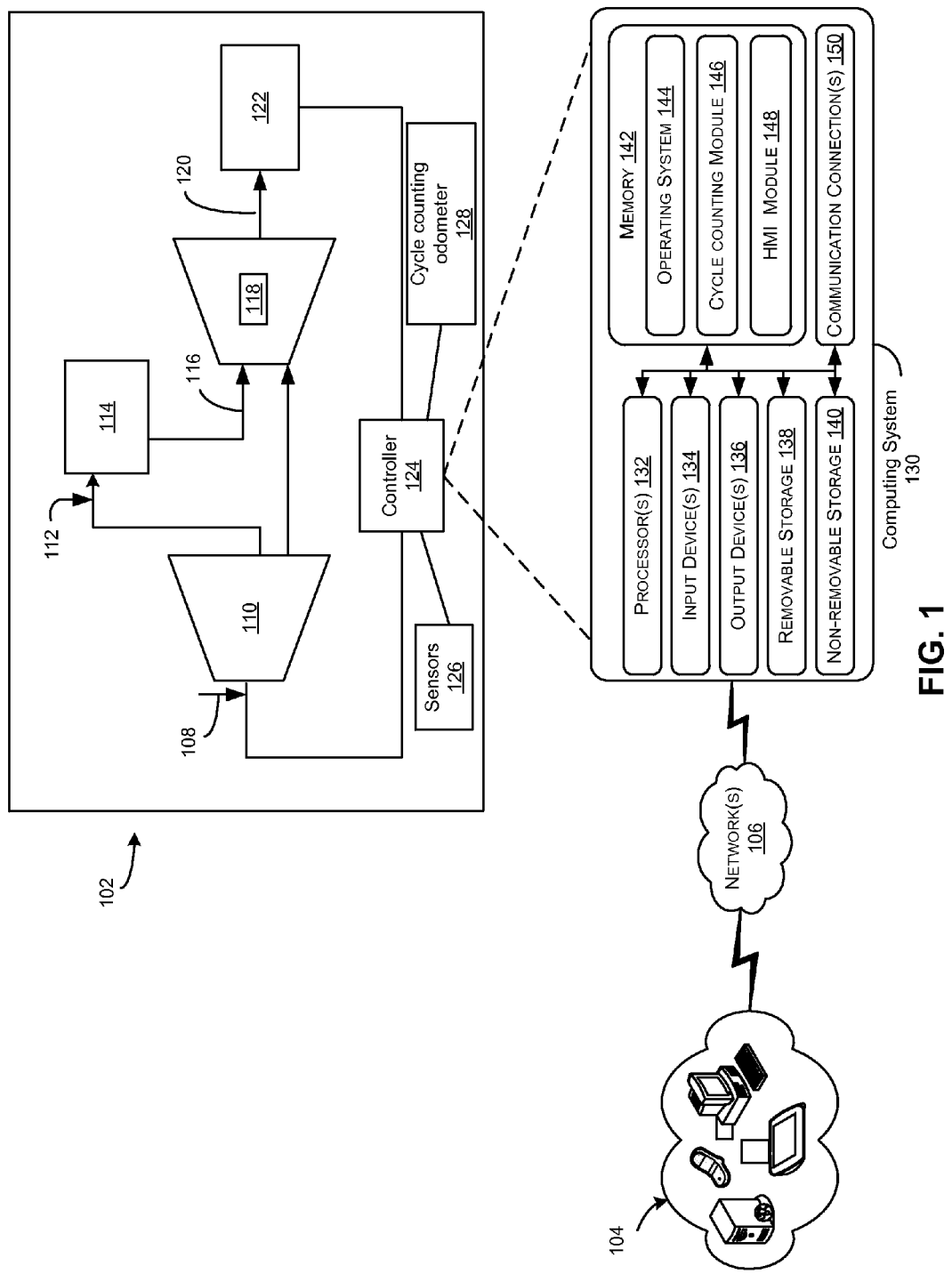
FIG. 1 is a schematic block diagram indicating an exemplary system for determining a predicted lifetime of various parts of a gas turbine engine, according to at least one embodiment of the disclosure.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. Like numbers refer to like elements throughout.

A turbine engine may comprise many parts and components that have different operating conditions and that are exposed to different levels of usage during operation. Routine operations may cause degradation of the various parts of a turbine engine over time. The degradation of the parts may be quantified in terms of operational hours. Each part of the turbine engine may be given a predefined total operational hours as a lifetime limit on its usage. However, certain events or operational usage may contribute to faster degradation of these engine parts and components. Therefore, purely quantifying the degradation based on operational hours may not provide an accurate assessment of the current state of degradation of the engine parts.

Operational usage of the engine, under these circumstances, may create a higher level of degradation on the engine components. In one example, two turbine engines with the usage hour metric may still have different levels of degradation based on the specific operational usage. For example, a first turbine might be used by an aircraft that routinely travels short routes with frequent take-offs and landings; therefore, the turbine engine might be exposed to higher amounts of throttling. A second turbine engine may be used in an aircraft used for longer routes with less landings and take-offs; therefore, there may be more steady state rotations on the components and less throttling. In this example, even if both of the turbine engines were used for 100 hours, certain parts of the first turbine engine may exhibit signs of degradation equivalent to about 1,000 hours of usage. Therefore, using a simple calculation of a lifetime limit based only on usage hours may not provide an accurate assessment of the current state of degradation.

In order to account for the individual characteristic degradation based on operational usage, turbine engines may be regularly inspected manually, by repair crews, to identify the status of the various parts. Traditionally, certain inspection procedures are used to identify these potential problems and failures. In one example, a manual inspection may be typically performed on a turbine engine after a predetermined period of time to assess the degradation on specific engine components. These manual inspections may identify some degradation, but the inspections may be cost-prohibitive. Further, manual inspections may not detect all possible damage or faults to the engine components. For example, sometimes small leaks in the combustor may cause improper combustion of the fuel, but these leaks may not be detectable through manual inspection alone.

Embodiments of this disclosure may provide for methods which may include determining a lifetime associated with an engine. Some embodiments may also determine a lifetime associated with various parts of the gas turbine engine. The embodiments of this disclosure may define the lifetime of the engine or parts of the engine in terms of total operating hours. Each increment in the operation hour may be identified as a cycle. The method may also include determining a plurality of cycles associated with the engine or the parts of the gas turbine engine. According to at least one embodiment of the disclosure, examples of these cycles may include full cycle, partial cycle, and trip cycles. The full cycle, partial cycle, or trip cycle may trigger a different increment in a cycle count. This may be based on corresponding values in the various parameters. The method may also provide for identifying these plurality of cycles based on a category or a parameter. In one embodiment, the method for determining a category may further disclose identifying each of the plurality of cycles based on an acceleration value associated with the various parts of the engine. The acceleration value may be positive or negative. The method may further include transmitting the predicted lifetime to a computing device. In other embodiments, the method may output a human-machine interface (HMI) for each of the categories, parameters, and predicted lifetimes.

Embodiments of this disclosure may provide for an apparatus including a gas turbine engine with control logic to calculate a lifetime of the engine. The control logic may also be configured with logic circuitry to determine a lifetime associated with various parts of the gas turbine engine. The embodiments of this disclosure may define the lifetime of the engine or the parts of the engine in terms of total operating hours. Each increment in the operation hour may be identified as a cycle. The control logic may also utilize a counter. The counter may also determine a plurality of cycles associated with the engine or the parts of the gas turbine engine. According to at least one embodiment of the disclosure, examples of these cycles may include full cycles, partial cycles, and trip cycles. The full cycle, partial cycle, or trip cycle may trigger a different increment in a cycle count. This may be based on corresponding values in the various parameters. The counter may receive signals indicative of various values for various parameters. The control logic may also be configured to identify these plurality of cycles based on a category or a parameter. In one embodiment, the counter may receive an acceleration value associated with the various parts of the engine. The acceleration value may be positive or negative. The method may further include transmitting the predicted lifetime to a computing device. In other embodiments, the method may output a human-machine interface (HMI) for each of the categories, parameters, and predicted lifetimes.

FIG. 1 is a schematic block diagram of a system for detecting operational conditions of a gas turbine engine. This system 100 may include a gas turbine engine and associated controllers. In some embodiments, the gas turbine engine and associated controllers may be in communication with diagnostic devices 104. Further, the controllers may communicate with the diagnostic devices 104 through a network 106. The network 106 can be any type or combination of wired or wireless networks, local or wide area networks, and/or the Internet.

Under normal conditions, atmospheric air may enter the gas turbine engine 102 through an inlet 108. The air may be compressed by a compressor 110. Although in FIG. 1 only a single compressor 110 is depicted, a gas turbine engine 102 may include any number of compressors 110. In one example, the compressor 110 may be a low-speed compressor with a low-speed rotor shaft. In other examples, the compressor 110 may include a high-speed compressor with a high-speed rotor shaft. In some embodiments, compressed air from a low-speed compressor may be passed to the high-speed compressor for further compression. Compressed air from the compressor 110 may be outputted to a combustor 114, where the compressed air is mixed with fuel mixture 112 and ignited.

The compressed gas fuel mixture 112 may be passed to a turbine 118. A turbine 118 may be configured with any number of rotor blades (not shown). The combined air fuel mixture 112 may cause differential pressure as it is passed through the rotor blades. This may cause the turbine 118 to develop torque. Although, in FIG. 1, only a single turbine 118 is depicted, a gas turbine engine 102 may include any number of turbines that are used either sequentially or in parallel. In one example, a combustion gas product may pass through a high-speed turbine with high-speed rotor shafts causing rotation of the high-speed turbine. In another example, these gases may also pass through a low-speed turbine. These gases may further exit the gas turbine engine 102 through an exhaust nozzle 120. In one embodiment, if the turbine is used to operate an aircraft, the exiting air through the exhaust nozzle 120 may produce engine thrust propelling the aircraft forward. If the turbine is used to generate power, then the turbine may be connected to a crankshaft or other rotators to produce mechanical work in order to generate power.

With further reference to FIG. 1, the gas turbine engine 102 may be connected to a controller 124. The controller 124 may be implemented as appropriate in hardware, software, firmware, or combinations thereof. Software or firmware implementations of the controller 124 may include computer-executable or machine-executable instructions written in any suitable programming language to perform the various functions described. Hardware implementations of the controller 124 may include logic gates, logic blocks, or other logic circuitry to control and operate the gas turbine engine 102. According to these embodiments, a direct communication connection may exist between any of the above described parts of the gas turbine engine 102 and the controller 124.

With further reference to FIG. 1, the controller 124 may be in communication with one or more sensors 126. The operation of the gas turbine engine 102 may be monitored by one or more sensors 126. These sensors 126 may be configured to detect various conditions of the gas turbine engine 102 and may sense various parameters of the environment. For example, temperature sensors may monitor the ambient temperature surrounding the gas turbine engine 102, the compressor discharge temperature, the turbine exhaust gas temperature, and other temperature measurements of the gas stream through the gas turbine engine 102. Pressure sensors may monitor ambient pressure, and static and dynamic pressure levels at the compressor inlet and outlet, and turbine exhaust, as well as at other locations in the gas stream. Further, humidity sensors (e.g., wet and dry bulb thermometers) may measure ambient humidity in the inlet duct of the compressor. The sensors 126 may also comprise flow sensors, speed sensors, flame detector sensors, valve position sensors, guide vane angle sensors, or the like that sense various parameters pertinent to the operation of gas turbine engine 102. As used herein, "parameters" and similar terms may refer to items that can be used to define the operating conditions of the gas turbine engine 102, such as temperatures, pressures, and flows at defined locations in the gas turbine engine 102 that can be used to represent a given turbine operating condition.

The controller 124 may be configured to receive output signals from the sensors 126. The controller 124 may transmit these sensor signals to the cycle-counting odometer 128 in some embodiments. In other embodiments, the cycle-counting odometer 128 may be configured to directly receive various signals indicative of the operational parameters of the gas turbine engine 102.

The controller 124 may be connected to a cycle-counting odometer 128. The cycle-counting odometer 128 may be implemented as appropriate in hardware, software, firmware, or combinations thereof. Software or firmware implementations of the cycle-counting odometer 128 may include computer-executable or machine-executable instructions written in any suitable programming language to perform the various functions described. Hardware implementations of the cycle-counting odometer 128 may include logic gates, logic blocks, or other logic circuitry to receive signals and count various parameters associated with engine cycle detection. According to these embodiments, a direct communication connection may exist between any of the above described parts of the gas turbine engine 102 and the cycle-counting odometer 128. The cycle-counting odometer 128 may be configured with logic circuitry to identify various operational usage modes that may provide for differing levels of degradation.

Further, the cycle-counting odometer 128 may identify a quantifier, such as a life-cycle increment value, to account for the degradation based on the operational usage mode. In one example, a life-cycle increment of a full cycle may be identified with various operational modes. One example of such an operational mode may include a turbine 118 having a rotational velocity in excess of about 4,000 RPM. Another example of an operation mode causing an increment of full-cycle degradation may be the acceleration of the turbine 118 from a low-pressure state, when the rotational velocity is greater than about 3,500 RPM Another example of a quantifier with a life-cycle increment value may include a partial cycle. The degradation identified by the partial cycle may be identified as a weight of the degradation caused by the operational modes of a full cycle. Examples of operational modes that may cause a degradation quantified as a partial cycle may include a decrease in power greater than a percentage threshold. Another example may include a decrease in power passed over a threshold followed by an increase in power over another threshold, greater than X percent from a current steady power to any controlled power setting. These various operational modes that cause a degradation equivalent to a partial cycle may be identified by the cycle-counting odometer 128.

Another quantifier associated with a life-cycle count may be a trip cycle. A trip cycle may include various operational modes that may lead to severe degradation of any parts of the gas turbine engine 102 or to critical engine failure. For example, the cycle-counting odometer 128 may receive signals indicative of various operational modes from the sensors 126. If the sensors 126 indicate that the gas turbine engine 102 is running on critical operational points, such that it is unsafe for the engine or for the people near the engine, the controller 124 may trip the unit or cause it to shut off. A shut-off may be accomplished in some embodiments through disengagement of the supplied fuel. In such a case, the counter may indicate an increment of a trip cycle.

Another example of an operational condition associated with the trip cycle may include a failure of one of the components of the gas turbine engine 102, wherein the component may be deemed as a critical component, such that the gas turbine engine 102 may not be functional without the component. For example, if the combustor 114 fails, the controller 124 may initiate a shut-down or immediately disengage the fuel supplied to the gas turbine engine 102. This may also be configured to increment the trip-cycle counter.

Further, the trip cycle may have a weight associated with the respective engine mode or failure mode or wear and tear. For example, a trip cycle may count as about 2 times of a full life cycle, while a partial cycle may only count as about 0.8 of a full life cycle in terms of degradation.

The cycle-counting odometer 128 may be further configured to receive signals from the sensors 126 to identify the occurrence of various operational modes and parameters associated with the operational modes. In one example, an operational mode may be the failure of the compressed gas fuel mixture 112 in the combustor 114 to ignite. This may be detected by the parameter of a rotational velocity below a particular threshold in the turbine 118. In this example, the cycle-counting odometer 128 may receive a signal representative of a low rotational velocity. The cycle-counting odometer 128 may be further equipped with threshold detector logic. If the received signal value falls below a threshold, the cycle-counting odometer 128, in this example, may identify a trip cycle and may transmit an increment value, associated with the trip cycle, in a signal to the controller 124. Upon receiving these various parameters associated with different operational modes, the cycle-counting odometer 128 may either communicate with a controller 124 or a computing system 130

The computing system 130 may be communicatively connected to the controller 124 and may communicate with the controller 124. Alternatively, the computing system 130 may be communicatively coupled with the gas turbine engine 102. The computing system 130, via one or more software programs or modules described in greater detail below, may perform a number of functions to implement or facilitate the processes described herein. For example, the computing system 130 may receive, monitor, or analyze various cycle-count readings from either the controller 124 or the cycle-counting odometer 128.

The computing system 130 may include one or more computing devices, which may include, but are not limited to, a processor 132 capable of communicating with a memory 142. The memory 142 may store program instructions that are loadable and executable on the processor 132, as well as data generated during the execution of these programs. Depending on the configuration and type of computing system 130, a memory 142 may be volatile (such as random access memory (RAM)) and/or non-volatile (such as read-only memory (ROM), flash memory, etc.). In some embodiments, the computing system 130 may also include additional removable storage 138 and/or non-removable storage 140 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 142 may include multiple different types of memory, such as static random access memory (SRAM), dynamic random access memory (DRAM), or ROM.

The memory 142, removable storage 138, and non-removable storage 140 are all examples of computer-readable storage media. For example, computer-readable storage media may include volatile and non-volatile, removable and non-removable media implemented in any method or technology for storage of information such as computer-readable instructions, data structures, program modules, or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing system 130 may also contain one or more communication connections 150 that allow the devices to communicate with the controller 124. The connections can be established via various data communication channels or ports, such as USB or COM ports, to receive connections for cables connecting the devices, e.g., control devices, to various other devices in an IO network. Devices in the IO network can include communication drivers such as Ethernet drivers that enable the devices to communicate with other devices on the IO network. According to various embodiments, the communication connections 150 may be established via a wired and/or wireless connection on the IO network.

The computing system 130 may also include one or more input devices 134, such as a keyboard, mouse, pen, voice input device, and touch input device. It may also include one or more output devices 136, such as a display, a printer, and speakers.

Turning to the contents of the memory 142, the memory 142 may include, but is not limited to, an operating system (OS) 144 and one or more application programs or modules for implementing the features and aspects disclosed herein.

Further, the memory 142 may contain a cycle-counting module 146. The cycle-counting module 146 may receive data from the cycle-counting odometer 128 identifying various parts of a gas turbine engine 102 and an associated cycle increment value based on a detected parameter for an operational mode. The cycle-counting module 146 may communicate with the memory 142 to retrieve previously stored values from a database. This data may contain values of previous operations and usage, values for the gas turbine engine 102 over time etc. Further, the cycle-counting module 146 may transmit encoded control instructions to an HMI module 148 upon detection of various operational conditions of parameters. The cycle-counting module 146 may increment previous operational and usage values with the current values received from the cycle-counting odometer 128 for each engine part. The memory 142 may be further configured with the HMI module 148. The HMI module 148 may be implemented as appropriate in hardware, software, firmware, or combinations thereof. Software or firmware implementations of the HMI module 148 may include computer-executable or machine-executable instructions written in any suitable programming language to perform the various functions described. Hardware implementations of the HMI module 148 may include logic gates, logic blocks, or other logic circuitry to receive signals and count various parameters associated with engine cycle detection.

The HMI module 148 may receive data and control instructions from the cycle-counting module 146. The HMI module 148, based on the received data and control instructions, may create alerts or display a graphical user interface indicative of the operational parameters of the gas turbine engine 102. The alert may be transmitted as an email, Short-Form Messages, an application, or a web-based interface to facilitate an operation of the diagnostic device 104. The alerts may further identify a recommendation. The recommendation may include repairs on certain engine parts or instructions to replace the engine parts. The alerts may also be transmitted while the gas turbine engine 102 is operating.

The HMI module 148 may also store or retrieve a plurality of predefined alerts or messages indicative of various operational conditions and parameters of the gas turbine engine 102. In one embodiment, the HMI module 148 may generate reports of diagnostic information of the gas turbine engine 102. These reports may be based on control instructions decoded through the control instructions, messages, and signals received from the cycle-counting module 146. The diagnostic information may be displayed through a network 106 to one or more diagnostic devices 104.

The diagnostic messages may be transmitted at regular intervals. Alternatively, the HMI module 148 may store the diagnostic messages and transmit them upon a request made through one of the communication connections 150. In a second example, the HMI module 148 may transmit diagnostic messages periodically. For example, the HMI module 148 may be configured to transmit diagnostic messages every 12 hours.

The diagnostic messages or alerts may be transmitted upon detection of certain operational conditions. For example, if the gas turbine engine 102 is associated with a jet or an airplane, the HMI module 148 may transmit the diagnostic messages, alerts, or reports to a ground crew, when it detects that the gas turbine engine 102 has been turned off. Further, the alerts may be used when certain critical operational modes are detected. For example, the alert may be transmitted upon detection of a value over a threshold known as the critical cycle count.

The transmission mode of the messages may be dependent upon the operational conditions or operational modes that were detected. For example, upon detection of a critical cycle count, the HMI module 148 may transmit an alert to a remote user terminal of one of the diagnostic devices 104. However, if there is a detection of another operational condition, such as a full-cycle count, the HMI module 148 may transmit the alert at a certain predetermined time, etc.

The diagnostic devices 104 may include any number of computing components that include one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, minicomputers, transceivers, user terminals, vehicle computing systems, in-jet computing systems, air-traffic controller radio systems, etc. The execution of suitable computer-implemented instructions by one or more processors associated with various devices may form special purpose computers or other particular machines that may facilitate optimized configuration of software. The diagnostic device 104 may be configured to receive various alert messages and diagnostic information indicative of various operational modes of the gas turbine engine 102. These messages may be retrieved through a software program or application module available on the diagnostic devices 104.

References are made to the schematic block diagram of systems, methods, and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of the blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, main computers, etc.

Application programs that are components of the systems and methods described herein may include routines, programs, components, data structures, etc., that implements certain abstract data types and perform certain tasks or actions. In a distributed computing environment, the application program (in whole or in part) may be located in local memory, or in other storage. In the alternative, the application program (in whole or in part) may be located in remote memory or in storage to allow for circumstances where tasks are performed by remote processing devices through a communication network.

The example system shown in FIG. 1 is provided by way of example only. Numerous other operating environments, system architectures, and device configurations are possible. Accordingly, embodiments of the present disclosure should not be construed as being limited to any particular operating environment, system architecture, or device configuration.

Figure 2:
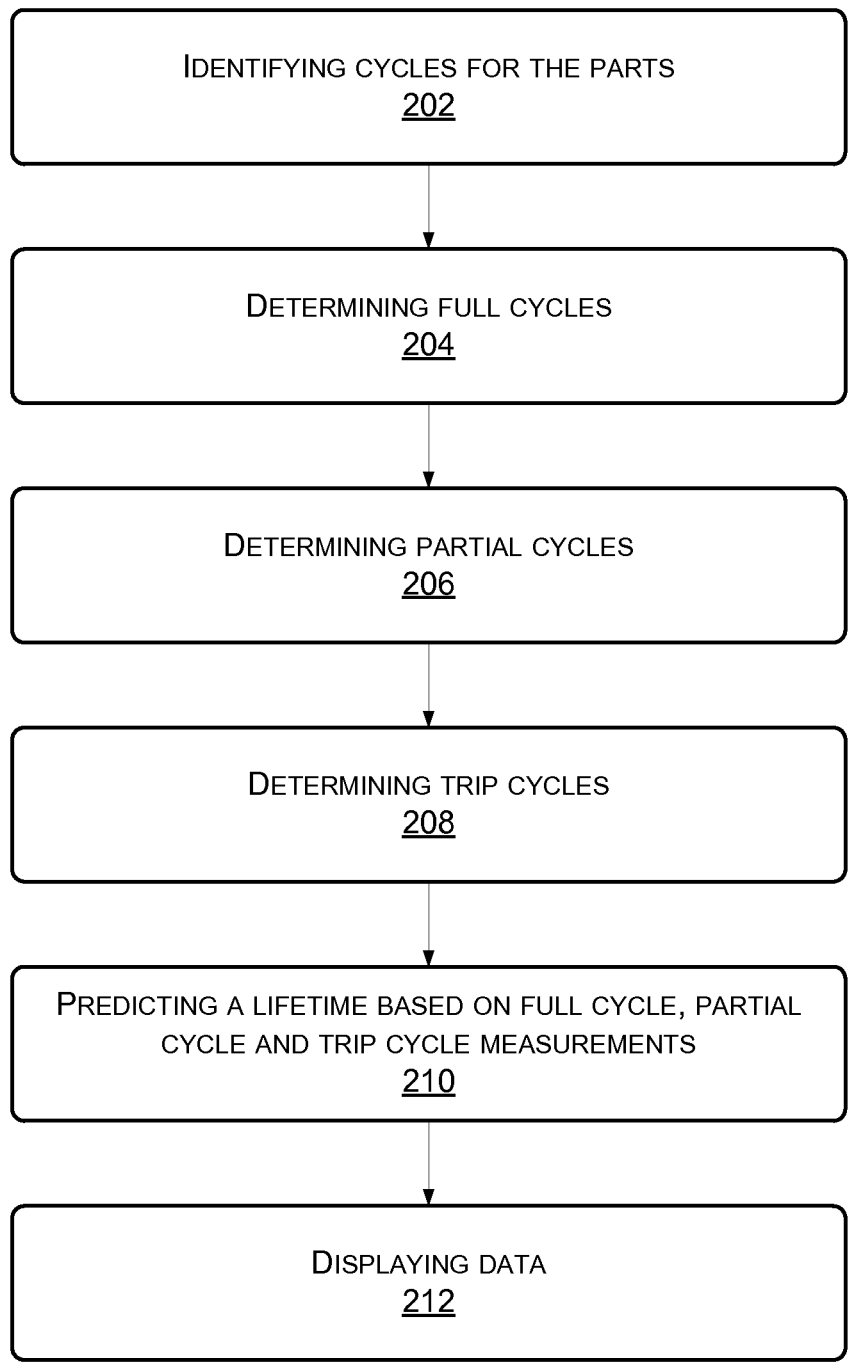
FIG. 2 is a flow diagram indicating an exemplary method for determining a predicted lifetime of various parts of a gas turbine engine, according to at least one embodiment of the disclosure.

FIG. 2 is a flow diagram indicating an exemplary method for determining a predicted lifetime of various parts of a gas turbine engine 102. The method 200 may identify an example embodiment for predicting a lifetime of a gas turbine engine 102. Portions of the flow diagram may be implemented using the cycle-counting odometer 128, a cycle-counting module 146, or an HMI module 148

In block 202, the various operational modes defined as cycles are identified for each part. In one embodiment, signals may be retrieved from each of the parts of the gas turbine engine 102 by the cycle-counting odometer 128. There may be logic circuitry to identify signals that fall above or below certain threshold values. The cycle-counting odometer 128 may receive representative signals for the various parameters associated with the operational modes and corresponding increments to the cycle count. Examples may include signals representative of the maximum rotational velocity. Examples of these parameters may include acceleration rate, thrust, jerk, and throttle of the gas turbine engine 102. These parameters may then trigger a cycle count based on their values, and these values may be indicative of various operational modes.

In block 204, the parameters associated with operational modes that cause a full-cycle increment may be determined for each of the engine parts. Parameters that were identified to cause a degradation equivalent to an increment of a full-cycle count may be identified for each of the parts of the gas turbine engine 102 and incremented. These parameters may include a rotational velocity greater than about 4,000 RPM for the rotor blades. Another example of a parameter that may trigger a full-cycle increment may include any part that has an acceleration or a deceleration greater than a certain threshold. Another example may be a change in the pressure for the compressed gas fuel mixture 112 below a certain threshold. Further, these parameters may be further refined. Therefore, if the same parameter is detected during a start or shut-down phase, it may lead to a different increment than if the same parameter is detected during operation or usage. For example, in the case of an aircraft engine, the take-off and landing phases generate rapid changes in velocity and acceleration that may cause stress to various parts of the gas turbine engine 102. In other examples, certain types of repairs may be indicative of a degradation equivalent to a full-cycle. For example, relatively minor repairs to various parts of a gas-turbine engine 102 may be identified as a full cycle.

In block 206, parameters associated with operational modes that cause a partial cycle increment may be determined for each of the engine parts. Parameters that were identified to increment a partial-cycle count may be identified for each of the parts of the gas turbine engine 102 and incremented accordingly. Examples of parameters that may trigger a partial-cycle count increment may include any decrease in power greater than a predetermined threshold. Another example may be any sudden increase in a rotational velocity or acceleration rate followed by a controlled lowering between two threshold values. In the case of a power-generator, a partial cycle may include any steady-state power where the generator breaker closes. There may be further gradations of partial cycles. For example, if the values for the acceleration are between two thresholds, the weighted cycle increment may be different than for values above the threshold. Further, the weights may be coefficients proportional to the amount of degradation estimated by a particular operational mode. For example, a parameter indicative of a sudden increase in rotational velocity may be weighted by a coefficient of 5. However, a parameter indicative of a shut-down during operation may be weighted by a coefficient of about 10. The second partial cycle in this situation may be estimated to have higher levels of degradation due to a particular engine part. Therefore, the cycle count may increment by a value of about 10 times the value of the operational modes that cause the full-cycle increment and twice the value of the operational mode identified by a sudden increase in the rotational velocity cycle.

In block 208, parameters associated with operational modes that cause a trip-cycle increment may be determined for each of the engine parts of the gas turbine engine 102. Examples of these parameters may include a rotational jerk greater than a threshold value. Another example may be a change in the pressure for the compressed gas fuel mixture 112 where the pressure falls below a certain threshold. This operational mode may also have a further refined parameter of detection of a failure to ignite during usage. In the case of an aircraft engine, a mid-air failure of a combustor 114 may identify a degradation equivalent of a trip cycle. The trip cycle may further trigger an alert transmission. The alert transmission may be during real-time. This alert may be different from a typical HMI display. The alert may be transmitted to diagnostic devices 104 or stored locally. The alerts may also be encoded as predefined industry standard instructions.

In block 210, a lifetime may be predicted for the engine. A lifetime may be calculated individually for each of the parts of the gas-turbine engine 102, and a combined weighted value for the entire gas-turbine engine 102 may also be identified. These may be defined in terms of overall operating hours. Therefore, there may be threshold values for each of the parts, and a threshold value of the engine as a whole.

In block 212, data of the predicted lifetime may be displayed. The data may be transmitted and outputted as an HMI. The data may include each of the parts of the gas turbine engine 102 and a current cycle count that may represent a degradation or replacement value. In other embodiments, recommended courses of actions may be identified based on the current cycle count value.

It should be noted that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
   determining, by a processor, a plurality of cycles of one or more operational modes associated with one or more engine parts of an engine, wherein each cycle of the plurality of cycles represents an incremental operational hour of the one or more engine parts;
   determining, by the processor, a category for each of the plurality of cycles based at least in part on a threshold value of a gas turbine operational parameter associated with each of the plurality of cycles;
   determining, by the processor, a weighted factor for each category based on an amount of degradation estimated by a particular operational mode;
   determining, by the processor, an increment in a cycle count of the plurality of cycles based at least in part on the determined weighted factor of each category associated with each engine part;
   predicting, by the processor, a life cycle associated with each engine part based at least in part on the incremental cycle count associated with each engine part;
   predicting, by the processor, a life cycle associated with the engine based at least in part on the predicted life cycle associated with each engine part;
   generating, by the processor, a first realtime alert based at least in part on the predicted life cycle associated with each engine part;
   generating, by the processor, a second realtime alert based at least in part on the predicted life cycle associated with the engine; and
   implementing at least one recommendation to repair or replace at least one engine part based at least in part on the predicted life cycle associated with the engine.

2. The method of claim 1, wherein predicting a life cycle further comprises:
   identifying trip cycles within the plurality of cycles associated with the engine;
   associating a corresponding value for each of the trip cycles associated with the plurality of cycles; and
   determining the life cycle based at least in part on the corresponding value.

3. The method of claim 2, further comprising:
   identifying at least one engine part associated with the trip cycles.

4. The method of claim 3, further comprising:
   determining a replacement cycle for the at least one engine part based at least in part on the trip cycles; and
   transmitting an indication to a computing device, upon occurrence of the replacement cycle.

5. The method of claim 1, further comprising:
   determining a replacement cycle for the engine based at least in part on the predicted life cycle; and
   transmitting an indication to a computing device, upon occurrence of the replacement cycle.

6. The method of claim 1, wherein the determined category comprises one of the following:
   a full cycle;
   a partial cycle; or
   a trip cycle.

7. The method of claim 1, wherein predicting the life cycle further comprises:
   determining a value associated with a total number of hours of operation for the engine; and
   predicting the life cycle based at least in part on the determined value associated with the total number of hours of operation for the engine.

8. The method of claim 1, further comprising:
   outputting the predicted lifetime to a display.

9. The method of claim 8, further comprising:
   outputting a human machine interface (HMI) indicating the determined category for each of the plurality of cycles to display.

10. An apparatus comprising:
    an engine;
    a counter configured to identify a plurality of cycle counts of one or more operational modes associated with one or more engine parts of the engine, wherein each cycle of the plurality of cycles represents an incremental operational hour of the one or more engine parts; and
    control logic, having at least one processor, configured to:
       identify a category for each of the plurality of cycle counts based at least in part on a threshold value of a gas turbine operational parameter associated with each of the plurality of cycles;
       determine a weighted factor for each category based on an amount of degradation estimated by a particular operational mode;
       determine, by the processor, an increment in a cycle count of the plurality of cycles based at least in part on the determined weighted factor of each category associated with each engine part;
       predict a life cycle associated with each engine part based at least in part on the incremental cycle count associated with each engine part;
       predict a life cycle based at least in part on the predicted life cycle associated with each engine part;
       generate a first realtime alert based at least in part on the predicted life cycle associated with each engine part, wherein the alert is a real-time alert;

generate a second realtime alert based at least in part on the predicted life cycle associated with the engine; and implement at least one recommendation to repair or replace at least one engine part based at least in part on the predicted life cycle associated with the engine.

11. The apparatus of claim 10, wherein identifying a category for each of the plurality of cycle counts further comprises:

identifying trip cycles within the plurality of cycles associated with the engine; and associating a corresponding value for each of the trip cycles associated with the plurality of cycles.

12. The apparatus of claim 10, wherein the control logic is configured to identify at least a portion of the engine part associated with the trip cycles.

13. The apparatus of claim 12, wherein the control logic is further configured to transmit an indication to replace the engine based at least in part on the identified at least one engine part.

14. The apparatus of claim 10, wherein the control logic is further configured to transmit an indication to replace the engine based at least in part on the predicted life cycle.

15. The apparatus of 10, wherein the determined category comprises one of the following:

a full cycle;

a partial cycle; or a trip cycle.

16. The apparatus of claim 10, wherein predicting the life cycle further comprises determining a value associated with a total number of hours of operation.

17. The apparatus of claim 10, wherein the control logic is further configured to output the predicted lifetime to a display.

18. The apparatus of claim 10, wherein the control logic is further configured to output a HMI indicating the determined category for each of the plurality of cycles to display.

19. One or more computer-readable media storing computer-executable instructions that, when executed by a processor, configure the processor to perform operations comprising:

determining, by the processor, a plurality of cycles of one or more operational modes associated with one or more engine parts of an engine, wherein each cycle of the plurality of cycles represents an incremental operational hour of the one or more engine parts;

determining, by the processor, a plurality of categories for each of the plurality of cycles based on a threshold value of a gas turbine operational parameter associated with each of the plurality of cycles;

determining, by the processor, a weighted factor for each category based on an amount of degradation estimated by a particular operational mode;

determining, by the processor, an increment in a cycle count of the plurality of cycles based at least in part on the determined weighted factor of each category associated with each engine part;

predicting, by the processor, a life cycle associated with each engine part based at least in part on the incremental cycle count associated with each engine part;

predicting, by the processor, a life cycle associated with the engine based at least in part on the predicted life cycle associated with each engine part;

generating, by the processor, a first realtime alert based at least in part on the predicted life cycle associated with each engine part;

generating, by the processor, a second realtime alert based at least in part on the predicted life cycle associated with the engine, wherein the alert is a real-time alert; and implementing at least one recommendation to repair or replace at least one engine part based at least in part on the predicted life cycle associated with the engine.

* * * * *